United States Patent [19]

Hattori

[11] Patent Number: 4,552,548

[45] Date of Patent: Nov. 12, 1985

[54] V-BELT TRANSMISSION APPARATUS

[75] Inventor: Torao Hattori, Wako, Japan

[73] Assignee: Honda Giken Kogyo Kabushiki Kaisha, Tokyo, Japan

[21] Appl. No.: 669,172

[22] Filed: Nov. 7, 1984

[30] Foreign Application Priority Data

Nov. 7, 1983 [JP] Japan .......................... 58-171320[U]

[51] Int. Cl.$^4$ .............................................. F16G 5/00
[52] U.S. Cl. ..................................... 474/201; 474/237
[58] Field of Search .............. 474/201, 202, 242, 244, 474/265, 237

[56] References Cited

U.S. PATENT DOCUMENTS

| 4,371,361 | 2/1983 | Giacosa | 474/201 |
| 4,457,742 | 7/1984 | Hattori et al. | 474/201 |
| 4,512,753 | 4/1985 | Hattori | 474/201 X |

FOREIGN PATENT DOCUMENTS

| 33-7762 | 9/1958 | Japan . | |
| 0054838 | 3/1984 | Japan | 474/201 |
| 0050252 | 3/1984 | Japan | 474/201 |

Primary Examiner—Stephen J. Novosad
Assistant Examiner—Thuy M. Bui
Attorney, Agent, or Firm—Armstrong, Nikaido, Marmelstein & Kubovcik

[57] ABSTRACT

A V-belt transmission is provided which comprises two pulleys, an endless metallic V-belt operatively positioned between the two pulleys, a plurality of V-shaped members positioned with the V-belt located between the arms of the V and a stopper member for engaging the V-shaped member to prevent the V-shaped member from coming off of the V-belt. The V-shaped member includes grooves in a wall of the arms of the V at a position below or inside the plane of the inner surface of the V-belt. Further, the stopper member includes a middle portion which is positioned above or outside the plane of the outer surface of the V-belt and end portions for engaging the grooves at a point below or inside the plane of the inner surface of the V-belt. The groove in the V-shaped member is located on the outside of the arms of the V and has a first portion which extends in the lengthwise direction of the V-belt and a second portion which extends perpendicular to the surface of the V-belt. The end portion of the stopper member has first and second portions, the first portion engaging the first portion of the groove and the second portion engaging the second portion of the groove. The middle and end portions of the stopper member are integral.

10 Claims, 7 Drawing Figures

V-BELT TRANSMISSION APPARATUS

BACKGROUND OF THE INVENTION

1. Field of the Invention

The present invention is directed to a V-belt type power transmission apparatus used for a stepless variable speed change transmission for a vehicle or the like, and more particularly, to a V-belt transmission apparatus of the type having a large number of V-shaped metallic members disposed in series along an endless metallic belt to form a V-belt assembly. The assembly is applied between V-pulleys on a driving side and a driven side for effecting power transmission.

2. Description of the Prior Art

An apparatus of this type is disclosed in Japanese Patent application No. Sho 58-70920, for example, in which each of a large number of intermediate members such as a hollow roller or the like are interposed between adjacent V-shaped metallic members on the inside of a metallic belt. Each of the V-shaped metallic members has a groove therein. A stopper member positioned outside of the metallic belt, is engaged in the groove and prevents the V-shaped metallic member from coming off the belt. It has been usual with this type of apparatus to have the stopper member engaged at its end portions with both sides of the V-shaped metallic member, with the engaging grooves made in wall portions on both sides or arms of the V-shaped metallic member beyond or outside of the plane of the outer surface of the metallic belt. In this case, the engaging groove has to be made in the wall portion of the arm of the V at a predetermined space from the top of the wall portion to give the necessary mechanical strength. The wall portion must have a comparatively large height extending beyond the plane of the belt corresponding to the total height of the thickness of the metallic belt, the groove width of the horizontal engaging groove positioned outside or above the metallic belt and the predetermined space. As a result, each V-shaped metallic member is increased in height, and the whole size and weight of the V-belt assembly is thereby increased.

SUMMARY OF THE INVENTION

It is the object of the present invention to provide a V-shaped member for use in a V-belt type power transmission apparatus in which a stopper member for holding the V-shaped member on the belt engages the V-shaped member at a position which increases the strength of the V-shaped member without substantially increasing the length of the wall portion or arms of the V beyond the plane of the belt.

The present invention is directed to a V-belt transmission which comprises two pulleys, an endless metallic V-belt operatively positioned between the two pulleys, a plurality of V-shaped members positioned with the V-belt located between the arms of the V and a stopper member for engaging the V-shaped member to prevent the V-shaped member from coming off of the V-belt. The V-shaped member includes grooves in a wall of the arms of the V at a position below or inside the plane of the inner surface of the V-belt. Further, the stopper member includes a middle portion which is positioned above or outside the plane of the outer surface of the V-belt and end portions for engaging the grooves at a point below or inside the inner surface of the V-belt. The groove in the V-shaped member is located in a wall of the arms of the V and has a first portion which extends in the lengthwise direction of the V-belt and a second portion which extends perpendicular to the surface of the V-belt. The end portion of the stopper member has first and second portions, the first portion engaging the first portion of the groove and the second portion engaging the second portion of the groove. The middle and end portions of the stopper member are integral.

DETAILED DESCRIPTION OF THE PREFERRED EMBODIMENT

Figure 1:
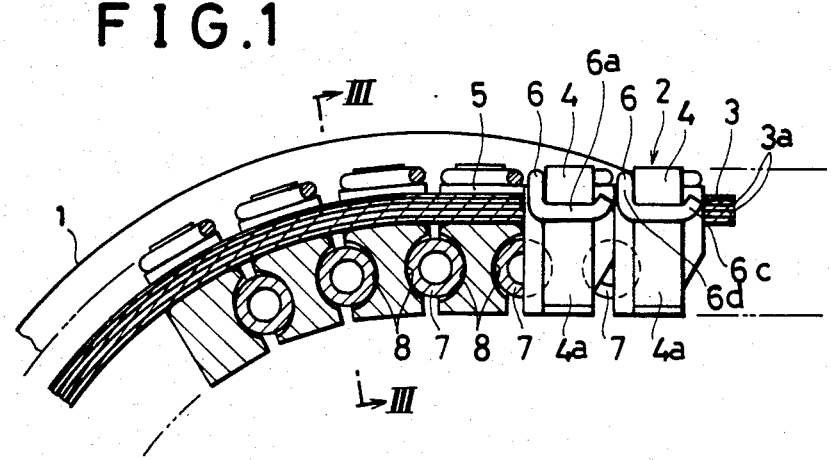
FIG. 1 is a side view, partly in section of a portion of one embodiment of the present invention.
Figure 2:
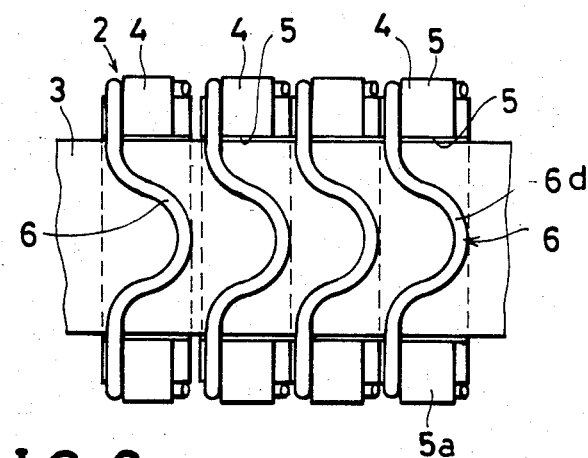
FIG. 2 is a top plan view thereof.
Figure 3:
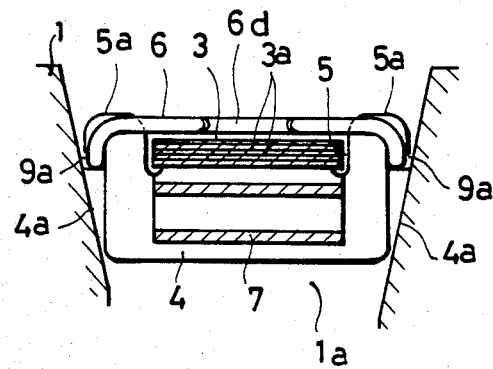
FIG. 3 a sectional view taken along the line III—III in FIG. 1.

Referring to FIGS. 1–3, a V-pulley 1 is on a driving side of a transmission, and a V-belt assembly 2 extends between the pulley 1 and a V-pulley (not ilustrated) on a driven side for effecting a power transmission therebetween.

The V-belt assembly 2 has a large number of V-shaped metallic members 4 disposed in series along on an endless metallic belt 3, which comprises plural hoop layer belt members 3a. Each of the V-shaped metallic members 4 has on the lateral sides or arms thereof, inclined outer surfaces 4a adapted to be in contact with a V-groove 1a of the pulley 1. A groove 5 in metallic member 4 opens outwardly from inside the belt 3. A stopper member 6 is positioned outside an outer surface of the metallic belt 3 in the groove 5 of the V-shaped metallic member 4 for preventing the V-shaped metallic member 4 from coming off the belt inwardly.

In the illustrated embodiment, a roller 7 is interposed between adjacent V-shaped metallic members 4 inside the metallic belt 3 and at least one of the mutually opposite front and rear roller receiving surfaces 8 of the adjacent V-shaped metallic members 4 is formed into an arc surface of a comparatively large curvature. Thus, when the V-shaped metallic member 4 is brought into engagement with and is pushed outwards by the V-pulley 1, the receiving surfaces 8 provide a wedge action and thereby a gap between the adjacent V-shaped metallic members 4 through the roller 7, is widened and a force is applied in the direction of increasing the turning radius of each V-shaped metallic member 4. Consequently, the pressure contact force of each V-shaped metallic member 4 against the metallic belt 3 can be increased, and the metallic belt 3 receives a tension force through each V-shaped metallic member 4.

According to the present invention, end portions 6a of the stopper 6, engage groove wall portions 5a located on the lateral sides of the groove 5 at a position lower than the upper surface of the metallic belt 3.

Figure 5:
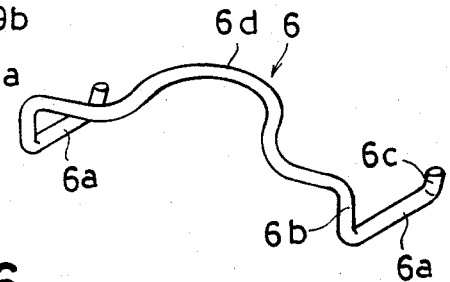
FIG. 5 is a perspective view of a stopper member thereof.

In order to prevent the forward and rearward movement of the end portions 6a in the groove wall portions 5a in the lengthwise direction of the metallic belt 3, a curved or crooked engaging groove 9 is formed in the walls of the arms of the V of the member 4. The groove 9 comprises a horizontal groove part 9a extending forwards and rearwards in the lengthwise direction of the metallic belt 3 and vertical groove parts 9b, extending outwards and inwards in the thickness direction of the metallic belt 3, is formed in a wall surface of each wall portion 5a. The end portions of the stopper member 6 are thus, positioned below the outer surface position of the metallic belt 3, that is, lower than the upper surface of the metallic belt 3. As shown in FIG. 5, the stopper member 6 is bent such that each end portion of a horizontal end part 6a has a downwardly vertical end part 6b and an upwardly vertical end part 6c which extends along the engaging groove 9b of the curved engaging groove 9.

Figure 6:
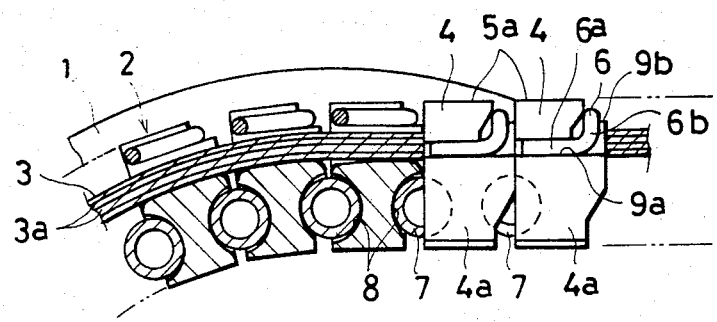
FIG. 6 is a side view, partly in section, of a portion of another embodiment of the present invention.
Figure 7:
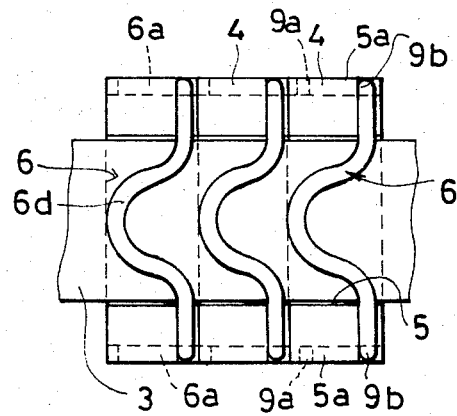
FIG. 7 is a top plan view thereof.

In this embodiment, the curved engaging groove 9 is formed in the wall surface of a lateral outside part of the wall portion 5a, but the same may be, of course, formed in the wall surface of a lateral inside part thereof. In addition, in another embodiment, as shown in FIGS. 6 and 7, the curved engaging groove 9 is formed into an L-shaped groove comprising a horizontal groove part 9a and a vertical groove part 9b on either of the forward or rearward edges of the lateral outer surface. In this embodiment, a modified stopper member 6 is used which has a horizontal end part 6a and a vertical end part 6b which is prevented from coming off in the front and rearward directions by the vertical groove portion 9b and a forward or rearward end surface of the groove wall portion 5a of the adjacent V-shaped metallic member 4.

In the above embodiments, the stopper member 6 is made of a resilient wire material bent at its middle portion 6d into a Ω form so that the horizontal end parts 6a thereof may be inserted in and engaged with the respective engaging grooves 9 by means of its own resilient force. In operation, the stopper member 6 has a large centrifugal force during the high speed turning of the V-belt assembly 2, and in conjunction with deformation of the stopper member 6 caused by this centrifugal force, there is a force generated in a direction such that the distance between the two end portions 6a is narrowed. If, accordingly, the curved engaging groove 9 is in the lateral outside wall surface of the wall portion 5a as mentioned above, the engaging force of the end portion 6a in relation to the engaging groove 9 can be strengthened, thereby assuring that the stopper member 6 does not come off even when it is turned at high speeds as a result of the turning of the V-belt assembly 2.

The operation of the invention will be explained as follows:

The stopper member 6 is brought into engagement at the end portions 6a thereof with the wall portions 5a of the V-shaped metallic member 4. The engaging position of the end portions 6a, are inside the plane of the outer surface of the metallic belt 3, so that, unlike the conventional apparatus wherein the stopper member is engaged with the wall portion with the engaging positions of the end portions thereof outside the plane of the outer surface of the metallic belt, it is not required that each wall portion 5a have a margin protruding outwards beyond the outer surface position of the metallic belt 3. It is possible with the present invention to form the wall portion 5a of the arm with a comparatively small height nearly equal to the thickness of the metallic belt 3, so that the whole of the V-belt assembly 2 can be decreased in size and weight.

Figure 4:
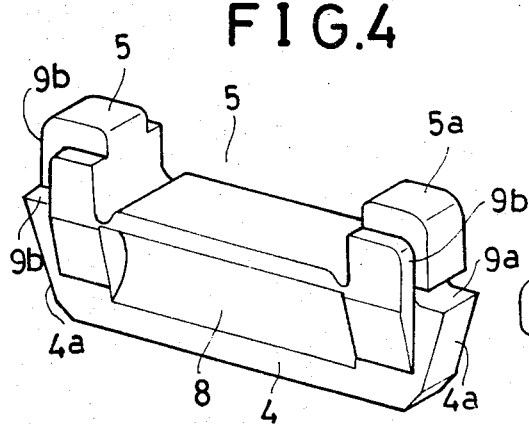
FIG. 4 is a perspective view of a V-shaped metallic member thereof.

In addition, by making the wall portion 5a small in height, it is possible to make the V-shaped metallic member 4 of a sintered alloy such as of Fe-C-Cu, Fe-C-Cu-Ni or the like which have excellent friction properties in oil. Since the sintered alloy is low in mechanical strength, especially, in impact resistance, if the wall portion 5a is made comparatively large in height, it is difficult to form the sintered alloy into the V-shaped metallic member because of the low mechanical strength. With the present invention, it becomes possible to use a sintered alloy because the wall portion 5a can be made small in height. Furthermore, where the metallic member 4 is formed as shown in FIG. 4, the shape thereof is complicated and the roller receiving surfaces 8 thereof are deeply concaved, the present invention has the advantage that the manufacturing thereof can be facilitated and mass-productivity thereof can be improved by using a sintered alloy.

Thus, according to the present invention, the end portions of the stopper member are engaged with the groove in the wall portions at a position below or inside of the plane of the outer surface of the metallic belt, so that the wall portions of a V-shaped metallic member can be of a comparatively small height extending just beyond the outer surface of the metallic belt, and consequently the V-belt assembly can be decreased in size and weight and the freedom in selecting the material for the V-shaped metallic member can be increased.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A V-shaped device for engaging an endless belt in a V-belt power transmission, said V-shaped metallic device comprising:
   (a) a V-shaped member having a groove in a wall of each arm of the V, wherein said V-shaped member is adapted to have the endless belt positioned between the arms of the V and wherein said grooves are positioned below the plane of the inner surface of the belt in the V; and
   (b) a stopper means having a middle portion extending between the arms of said V-shaped member outside of the belt and end portions engaging the grooves in the wall of the arms of said V-shaped member, wherein said stopper means prevents said V-shaped member from coming off the belt.

2. A V-shaped device as set forth in claim 1, wherein said groove in said V-shaped member includes a first portion extending in the lengthwise direction of the belt and a second portion extending in the thickness direction of the belt, and wherein the end portions of said stopper means include a first portion for engaging said first portion of said groove of said V-shaped member and a second portion for engaging said second portion of said groove of said V-shaped member.

3. A V-shaped device as set forth in claim 2, wherein said middle portion and said first and second portions of said end portions of said stopper means are integral.

4. A V-shaped device as set forth in claim 1, wherein said grooves are in the outside walls of the arms of said V-shaped member.

5. A V-shaped device as set forth in any one of claims 1–4, wherein said V-shaped member is a sintered alloy.

6. A V-belt transmission comprising two pulleys, an endless metallic V-belt operatively positioned therebetween, a plurality of V-shaped means positioned with said V-belt located between the arms of the V, and a stopper means for engaging said V-shaped means to prevent said V-shaped means from coming off of said V-belt, wherein said V-shaped means includes grooves in a wall of the arms of the V at a position below the plane of the inside surface of said V-belt and wherein said stopper means includes a middle portion positioned above or outside the plane of the outside surface of said V-belt means and end portions for engaging said grooves at a point below the plane of the inner surface of said V-belt means.

7. A V-belt transmission as set forth in claim 6, wherein said groove in said V-shaped means includes a first portion extending in the lengthwise direction of said belt and a second portion extending in the thickness direction of said belt and wherein the end portions of said stopper means includes a first portion for engaging said first portion of said groove of said V-shaped means and a second portion for engaging said second portion of said groove of said V-shaped means.

8. A V-shaped device as set forth in claim 6, wherein said middle portion and said first and second portions of said end portions of said stopper means are integral.

9. A V-shaped device as set forth in claim 6, wherein said grooves are in the outside walls of the arms of said V-shaped means.

10. A V-shaped device as set forth in any one of claims 6–9, wherein said V-shaped means is a sintered alloy.

* * * * *